United States Patent
Yin et al.

(10) Patent No.: US 11,393,016 B2
(45) Date of Patent: Jul. 19, 2022

(54) SMART MEAL ORDERING METHOD AND DEVICE

(71) Applicant: ADVANCED NEW TECHNOLOGIES CO., LTD., Grand Cayman (KY)

(72) Inventors: Huanmi Yin, Hangzhou (CN); Sihai Yao, Hangzhou (CN); Jun Wu, Hangzhou (CN); Ying Wang, Hangzhou (CN); Fang Fang, Hangzhou (CN); Cheng Xu, Hangzhou (CN); Rong Wang, Hangzhou (CN); Feng Lin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 604 days.

(21) Appl. No.: 16/144,278

(22) Filed: Sep. 27, 2018

(65) Prior Publication Data

US 2019/0102830 A1   Apr. 4, 2019

(30) Foreign Application Priority Data

Sep. 29, 2017   (CN) .......................... 201710908884.4

(51) Int. Cl.
*G06Q 20/40*   (2012.01)
*G06K 9/00*   (2022.01)
(Continued)

(52) U.S. Cl.
CPC ......... *G06Q 30/0641* (2013.01); *G06F 3/011* (2013.01); *G06F 3/017* (2013.01);
(Continued)

(58) Field of Classification Search
CPC .......... G06F 3/042; G06F 3/011; G06F 3/017; G06F 3/04883; G06Q 50/12; G06Q 30/0641; G06Q 20/3276; G06Q 20/4014
See application file for complete search history.

(56) References Cited

U.S. PATENT DOCUMENTS 6,914,582 B2   7/2005   Tanaka
7,680,690 B1   3/2010   Catalano
(Continued)

FOREIGN PATENT DOCUMENTS

CN   202838437 U   3/2013
CN   103279283 A   9/2013
(Continued)

OTHER PUBLICATIONS

Guntitat Sawadwuthikul et al,: Jan. 7, 2021,: IEEE Transactions on Industrial Informatics (vol. PP, Issue: 99, p. 1).*

(Continued)

*Primary Examiner* — Talia F Crawley (57) ABSTRACT

A smart meal ordering method comprises: conducting body sensing of a diner by a body sensing hardware of a smart meal ordering device; outputting a meal ordering interface by a display screen of a smart meal ordering device in response to sensing that the diner has taken a seat, and obtaining information of one or more dishes selected by the diner on the meal ordering interface; and in response to sensing that the diner has left the seat, sending a total price of the dishes and identification information of the smart meal ordering device to a server.

20 Claims, 5 Drawing Sheets

(51) Int. Cl.
| | |
|---|---|
| *G06Q 20/20* | (2012.01) |
| *G06Q 30/06* | (2012.01) |
| *G06Q 50/12* | (2012.01) |
| *G06F 3/01* | (2006.01) |
| *G06Q 20/32* | (2012.01) |
| *G07G 1/12* | (2006.01) |
| *G06F 3/042* | (2006.01) |
| *G06F 3/04883* | (2022.01) |

(52) U.S. Cl.
CPC ............ *G06F 3/042* (2013.01); *G06F 3/0425* (2013.01); *G06F 3/04883* (2013.01); *G06Q 20/208* (2013.01); *G06Q 20/3276* (2013.01); *G06Q 20/4014* (2013.01); *G06Q 50/12* (2013.01); *G07G 1/12* (2013.01); *G06F 2203/04101* (2013.01)

(56) References Cited

U.S. PATENT DOCUMENTS

| | | | |
|---|---|---|---|
| 8,249,946 | B2 | 8/2012 | Froseth et al. |
| 8,306,861 | B2* | 11/2012 | Dunsmore ............ G06Q 20/20 705/16 |
| 9,538,332 | B1* | 1/2017 | Mendelson ........... H04W 48/10 |
| 10,585,496 | B2* | 3/2020 | Jeon ....................... G06F 3/0304 |
| 2002/0052790 | A1 | 5/2002 | Tomishima |
| 2004/0054592 | A1 | 3/2004 | Hernblad |
| 2004/0158494 | A1 | 8/2004 | Suthar |
| 2005/0171800 | A1 | 8/2005 | Yamaguchi |
| 2005/0273345 | A1 | 12/2005 | Castillejo Romero |
| 2009/0055280 | A1* | 2/2009 | Dunsmore ........... G06Q 20/204 705/40 |
| 2009/0181131 | A1 | 7/2009 | Forbes-Roberts |
| 2010/0106607 | A1 | 4/2010 | Riddiford et al. |
| 2011/0040655 | A1 | 2/2011 | Hendrickson |
| 2011/0313867 | A9 | 12/2011 | Silver |
| 2013/0127980 | A1 | 5/2013 | Haddick et al. |
| 2013/0191229 | A1 | 7/2013 | Rodgers et al. |
| 2013/0275257 | A1* | 10/2013 | David ..................... G06Q 30/02 705/26.5 |
| 2014/0006182 | A1 | 1/2014 | Wilson |
| 2014/0122170 | A1* | 5/2014 | Padgett .............. G06Q 10/0631 705/7.29 |
| 2014/0122263 | A1* | 5/2014 | Padgett ................ G06Q 10/063 705/15 |
| 2014/0310103 | A1 | 10/2014 | Ricci |
| 2015/0039450 | A1 | 2/2015 | Hernblad |
| 2015/0046276 | A1* | 2/2015 | Artman ............ G06Q 20/40145 705/21 |
| 2015/0356563 | A1* | 12/2015 | Vohra ............... G06Q 20/40145 705/44 |
| 2016/0092965 | A1* | 3/2016 | Balar .................... G06Q 50/12 705/15 |
| 2016/0117762 | A1* | 4/2016 | Ahmad .................. G06Q 50/12 705/15 |
| 2016/0217536 | A1* | 7/2016 | Camp ..................... G06Q 50/12 |
| 2016/0350818 | A1* | 12/2016 | Saeed ................. G06Q 30/0643 |
| 2017/0046800 | A1* | 2/2017 | Zomet .................... G06Q 50/12 |
| 2017/0061523 | A1* | 3/2017 | Zambo ................ G06Q 30/0633 |
| 2017/0169495 | A1* | 6/2017 | Rathus .................... G06F 21/36 |
| 2017/0278204 | A1* | 9/2017 | Mimassi ................ G06Q 50/12 |
| 2018/0189901 | A1* | 7/2018 | Poisner .................. G06Q 50/12 |
| 2018/0197257 | A1* | 7/2018 | Bender ............. G06Q 30/0633 |
| 2018/0253730 | A1* | 9/2018 | Vohra ..................... G06Q 20/20 |
| 2018/0253805 | A1* | 9/2018 | Kelly ....................... G07F 9/009 |
| 2019/0272581 | A1 | 9/2019 | Li et al. |
| 2020/0103271 | A1* | 4/2020 | Abou Mahmoud ........................ G01G 23/3735 |
| 2020/0327530 | A1* | 10/2020 | Aoyama ............. G06Q 20/202 |

FOREIGN PATENT DOCUMENTS

| | | |
|---|---|---|
| CN | 104021506 A | 9/2014 |
| CN | 104077861 A | 10/2014 |
| CN | 104715428 A | 6/2015 |
| CN | 104939520 A | 9/2015 |
| CN | 104978697 A | 10/2015 |
| CN | 204698114 U | 10/2015 |
| CN | 105303276 A | 2/2016 |
| CN | 106780175 A | 5/2017 |
| CN | 107103503 A | 8/2017 |
| CN | 107194834 A | 9/2017 |
| KR | 101588023 B1 | 1/2016 |
| KR | 20160068403 A | 6/2016 |
| TW | M414769 U1 | 10/2011 |

OTHER PUBLICATIONS

Supplementary Search for Chinese Application No. 201710908884.4 dated Apr. 22, 2020.
Second Office Action for Chinese Application No. 201710908884.4 dated Mar. 3, 2020.
Third Office Action for Chinese Application No. 201710908884.4 dated Apr. 29, 2020.
Non-Final rejection and Search Report for Taiwanese Application No. 107115888 dated Jun. 14, 2019 (12 pages).
First Search for Chinese Application No. 201710908884.4 dated Aug. 27, 2019 (1 page).
First Office Action for Chinese Application No. 201710908884.4 dated Sep. 3, 2019 with English machine translation (20 pages).
PCT International Search Report and the Written Opinion dated Dec. 21, 2018, issued in related International Application No. PCT/US18/53106 (8 pages).
International Preliminary Report on patentability for PCT Application No. PCT/US2018/53106 dated Oct. 18, 2019 (15 pages).
Decision to reject for for Taiwanese Application No. 107115888 dated Oct. 18, 2019 (7 pages).
Search Report for European Application No. 18 862 277.3 dated Jun. 4, 2020.
Kossonon B. Eric et al., "IOT based smart restaurant system using RFID", 4th International Conference on Smart and Sustainable City, IEEE, Jun. 5, 2017.
Written Opinion for Singapore Patent Application No. 11202001805U dated Dec. 13, 2021.

* cited by examiner

SMART MEAL ORDERING METHOD AND DEVICE

CROSS REFERENCE TO RELATED APPLICATION

The present application is based on and claims priority to Chinese Patent Application No. 201710908884.4, filed on Sep. 29, 2017, which is incorporated herein by reference in its entirety.

TECHNICAL FIELD

This description relates to the field of computer applications, and more specifically, to a smart meal ordering method and a smart meal ordering device.

BACKGROUND

With the continuous popularization and development of mobile payment technologies, mobile payments are not only changing people's daily lives, but also gradually changing the retail modes of traditional offline businesses. In the beginning, more and more offline dining establishments began opting to cooperate with certain mobile payment platforms, achieving a closed loop between the user's offline dining and online payments, enabling people to use mobile terminal payment applications (also called APPs) for fast and convenient payment when dining offline.

SUMMARY

This description presents a dining settlement method, applied to a smart meal ordering device, the method comprising: conducting body sensing of a diner by an installed body sensing hardware; outputting a meal ordering interface by an installed display screen in response to sensing that the diner has taken a seat, and obtaining the information of one or more dishes selected by the diner on the meal ordering interface; and in response to sensing that the diner has left the seat, sending a total price of the dishes and identification information of a smart dining table to a payment server, for the payment server to carry out debit settlement, corresponding to the total price, from a payment account bundled with the identification information.

Optionally, a graphic code, generated based on the identification information of the smart meal ordering device, is attached to the smart meal ordering device.

Optionally, the method further comprises: collecting a facial image of the diner by an installed camera; uploading the collected facial image and the smart dining table's identification information to the payment server, for the payment server to bundle the smart dining table identification information with the payment account bundled with the facial image.

Optionally, the method further comprises: obtaining the user information pushed by the payment server, corresponding to the payment account; using the display screen to output a prompt, wherein the prompt comprises the obtained user information.

Optionally, the method further comprises: identifying a hovering gesture made by the diner; determining whether the identified hovering gesture matches a pre-set interactive gesture; triggering an interactive operation corresponding to the interactive gesture if the identified hovering gesture matches a pre-set interactive gesture.

Optionally, the body sensing of diners by the installed body sensing hardware comprises: sensing a distance between the diner and the smart dining table by the installed body sensing hardware; determining that the diner has taken the seat if the distance is less than or equal to a threshold value; and determining that the diner has left the seat if the distance is greater than the threshold value.

Optionally, the method further comprises: recording a first number of seated diners sensed by the body sensing hardware; obtaining a second number of seated diners identified by a camera located in the dining environment; and comparing the first number to the second number, and revising the first number based on the second number when the first number and the second number are not the same.

Optionally, in response to sensing that the diner has left the seat, sending the total price of the dishes and the identification information of the smart dining table to the payment server comprises: in response to sensing that the diner has left the seat, determining whether a number of individuals having left their seats is the number of the diners; if the number of individuals having left their seats is the number of diners, sending a total price of the dishes and the identification information of the smart dining table to the payment server; or if the number of individuals having left their seats is the number of diners, and a length of time for which each of the individuals having left their seats reaches a threshold value, sending the total price of the dishes and the identification information of the smart dining table to the payment server.

Optionally, the method further comprises: using a moment when the diner takes the seat as a starting moment, and calculating a dining time of the diners; determining whether the dining time has reached a threshold value; and if the dining time has reached a threshold value, sending a total price of the dishes and the identification of the smart dining table to a payment server, for the payment server to carry out debit settlement, corresponding to the total price, from the payment account bundled with the identification information.

Optionally, the payment account is an authorized credit account of the diner.

Optionally, the smart meal ordering device is the smart dining table.

This description also presents a smart meal ordering device, comprising: a body sensing hardware configured to conduct body sensing of diners; a communication hardware configured to conduct external communications through wireless and/or wired connections; a processor connected to the body sensing hardware and the communication hardware, wherein: when the body sensing hardware senses that the diner has taken a seat, the processor is configured to output a meal ordering interface by an installed display screen and obtains the information of one or more dishes selected by the diner in the meal ordering interface; and when the body sensing hardware senses that the diner has left the seat, the processor is configured to send a total price of the dishes and identification information of a smart dining table to a payment server, for the payment server to carry out debit settlement, corresponding to the total price, from a payment account bundled with the identification information.

Optionally, a graphic code, generated based on the identification information of the smart meal ordering device, is attached to the smart meal ordering device.

Optionally, the processor is further configured to: collect a facial image of the diner by an installed camera; and uploads the collected facial image and the smart dining table's identification information to the payment server, for the payment server to bundle the smart dining table identification information with the payment account bundled with the facial image.

Optionally, the processor is further configured to: identify a hovering gesture made by a diner; determine whether the identified hovering gesture matches a pre-set interactive gesture; and trigger an interactive operation corresponding to the interactive gesture if the identified hovering gesture matches a pre-set interactive gesture.

Optionally, the processor is further configured to: in response to sensing that the diner has left the seat, determine whether a number of individuals having left their seats is the number of the diners; if the number of individuals having left their seats is the number of diners, send a total price of the dishes and the identification information of the smart dining table to the payment server; or if the number of individuals having left their seats is the number of diners, and a length of time for which each of the individuals having left their seats reaches a threshold value, send the total price of the dishes and the identification information of the smart dining table to the payment server.

Optionally, the payment account is an authorized credit account of the diner.

Optionally, the smart meal ordering device is the smart dining table.

This description also presents a smart dining room payment system, comprising: a smart meal ordering device configured to conduct body sensing of a diner by an installed body sensing hardware; output a meal ordering interface through an installed display screen in response to sensing that a diner has taken a seat, and obtain the information of one or more dishes selected by the diner on the meal ordering interface; and in response to sensing that the diner has left the seat, send a total price of the dishes and the identification information of a smart dining table to a payment server; a payment server configured to look up a payment account bundled with the identification information of the smart meal ordering device, and conducting debit settlement corresponding to the total price from the payment account bundled with the identification information.

Optionally, a graphic code, generated based on the identification information of the smart meal ordering device, is attached to the smart meal ordering device; the smart dining room payment system also comprising: a payment client configured to scan the graphic code to establish a bundling relationship between the identification information identified from the graphic code and the corresponding payment account of the payment client, and upload the bundling relationship to a server; or upload the identification information identified from the graphic code to the payment server for the payment server to establish the bundling relationship between the identification information and the corresponding payment account of the payment client.

Optionally, the smart meal ordering device is further configured to: collect a facial image of the diner through an installed camera; and upload the collected facial image and the smart dining table's identification information to the payment server, for the payment server to bundle the smart dining table identification information with the payment account bundled with the facial image.

Optionally, the smart meal ordering device is further configured to: identify a hovering gesture made by the diner; determine whether the identified hovering gesture matches a pre-set interactive gesture; and trigger an interactive operation corresponding to the interactive gesture if the identified hovering gesture matches a pre-set interactive gesture.

Optionally, the smart meal ordering device is further configured to: in response to sensing that the diner has left the seat, determine whether a number of individuals having left their seats is the number of the diners; if the number of individuals having left their seats is the number of diners, send a total price of the dishes and the identification information of the smart dining table to the payment server; or if the number of individuals having left their seats is the number of diners, and a length of time for which each of the individuals having left their seats reaches a threshold value, send the total price of the dishes and the identification information of the smart dining table to the payment server.

Optionally, the payment account is an authorized credit account of the diner.

Optionally, the smart meal ordering device is the smart dining table.

According to another aspect, a smart meal ordering method comprises: conducting body sensing of a diner by a body sensing hardware of a smart meal ordering device; outputting a meal ordering interface by a display screen of a smart meal ordering device in response to sensing that the diner has taken a seat, and obtaining information of one or more dishes selected by the diner on the meal ordering interface; and in response to sensing that the diner has left the seat, sending a total price of the dishes and identification information of the smart meal ordering device to a server.

In some embodiments, a graphic code generated based on the identification information of the smart meal ordering device is attached to the smart meal ordering device; and the graphic code is configured for scanning by a client device of the diner and for establishing by the client device or the server a bundling relationship between the identification information identified from the graphic code and an account of the diner.

In some embodiments, the method further comprises: collecting a facial image of the diner by a camera; and uploading the collected facial image and the identification information of the smart meal ordering device to the server, for the server to bundle the identification information with a payment account associated with the facial image.

In some embodiments, the method further comprises: obtaining user information of the diner pushed by the server, corresponding to the payment account; and using the display screen to output a prompt, wherein the prompt comprises the obtained user information.

In some embodiments, the method further comprises: identifying a hovering gesture made by the diner; determining whether the identified hovering gesture matches a pre-set interactive gesture; and triggering an interactive operation corresponding to the interactive gesture if the identified hovering gesture matches a pre-set interactive gesture.

In some embodiments, the body sensing of the diner by the body sensing hardware comprises: sensing a distance between the diner and the smart dining table by the body sensing hardware; determining that the diner has taken the seat if the distance is less than or equal to a threshold value; and determining that the diner has left the seat if the distance is greater than the threshold value.

In some embodiments, the method further comprises: recording a first number of seated diners sensed by the body sensing hardware; obtaining a second number of seated diners identified by a camera; and comparing the first number to the second number and revising the first number based on the second number when the first number and the second number are not the same.

In some embodiments, in response to sensing that the diner has left the seat, sending the total price of the dishes and the identification information of the smart dining table to the server comprises: in response to sensing that a plurality of the diners have left their seats, determining whether a number of individuals having left their seats is a number of the diners; and if the number of individuals having left their seats is the number of diners, sending the total price of the dishes and the identification information of the smart dining table to the server.

In some embodiments, the method further comprises: using a moment when the diner takes the seat as a starting moment, and calculating a dining time of the diners; determining whether the dining time has reached a threshold value; and if the dining time has reached a threshold value, sending the total price of the dishes and the identification of the smart dining table to the server.

In some embodiments, the server is caused to transact payment for the dishes from an account of the diner to pay the total price.

In some embodiments, the smart meal ordering device comprises a smart dining table.

According to another aspect, a smart meal ordering device comprises: a sensor configured to conduct body sensing of a diner; a display screen configured to output a meal ordering interface in response to the sensor sensing that the diner has taken a seat, and obtain information of one or more dishes selected by the diner on the meal ordering interface; and a processor configured to, in response to the sensor sensing that the diner has left the seat, send a total price of the dishes and identification information of the smart meal ordering device to a server.

In some embodiments, the device further comprises: a graphic code generated based on the identification information of the smart meal ordering device, wherein: the graphic code is configured for scanning by a client device of the diner and for establishing by the client device or the server a bundling relationship between the identification information identified from the graphic code and an account of the diner.

In some embodiments, the device further comprises: a camera configured to collect a facial image of the diner, wherein: the processor is further configured to upload the collected facial image and the identification information of the smart meal ordering device to the server, for the server to bundle the identification information with a payment account associated with the facial image.

In some embodiments, the processor is further configured to obtain user information of the diner pushed by the server, corresponding to the payment account; and the display screen is further configured to output a prompt, wherein the prompt comprises the obtained user information.

In some embodiments, the device further comprises: another sensor configured to identify a hovering gesture made by the diner; and the processor is further configured to determine whether the identified hovering gesture matches a pre-set interactive gesture, and trigger an interactive operation corresponding to the interactive gesture if the identified hovering gesture matches a pre-set interactive gesture. In one example, the another sensor comprises an least one of infrared touch-control frame or another camera.

In some embodiments, to conduct body sensing of the diner, the sensor is configured to sense a distance between the diner and the smart dining table by the body sensing hardware; and the processor is configured to determine that the diner has taken the seat if the distance is less than or equal to a threshold value, and determine that the diner has left the seat if the distance is greater than the threshold value.

In some embodiments, the sensor, the display screen, and the processor are disposed in a smart dining table.

In some embodiments, the sensor comprises at least one of an infrared body sensor or an ultrasonic body sensor.

The technical scheme provided by the embodiments of this description, for one aspect, enables a user to quickly perform meal ordering operations when dining in an offline dining establishment, because the smart meal ordering device can output a meal ordering interface by an installed display screen when the installed body sensing hardware is used to sense when a diner has taken a seat; and for another aspect, because the smart meal ordering device can be bundled with a user's payment account in advance, and the smart meal ordering device can communicate with a payment server and automatically launch debit settlement with the payment server for the dishes selected by a user when the installed body sensing hardware senses that a diner has left their seat, the user does not need to manually launch dining settlement operations through a payment client when they are finished dining; through the smart meal ordering device, it is possible to achieve a closed loop between the user's offline dining and online payments, creating for offline dining establishment merchants a smart dining room payment system that can provide users with a truly "hands-free bill settlement" and barrier-free offline dining experience.

DETAILED DESCRIPTION

The purpose of this description is to provide a "hands-free bill settlement", barrier-free smart dining room payment system based on a smart meal ordering device.

During implementation, a smart meal ordering device (e.g., a smart dining table) can be equipped with a body sensing module (e.g., a sensor), as well as a wireless and/or wired communication hardware capable of conducting external communications (e.g., a WI-FI module can wirelessly communicate with a payment server by accessing an offline dining establishment's WI-FI hotspot).

In addition, the smart meal ordering device can be bundled with a user's payment account in advance (e.g., a graphic code, generated based on the identification information of the smart meal ordering device, can be attached to the smart meal ordering device, and the user can use a payment client to scan the graphic code, to launch an operation bundling the payment client's payment account to the smart meal ordering device's hardware identification).

During the dining process, the smart meal ordering device can use an installed body sensing module to conduct body sensing of the diners. When the smart meal ordering device senses that a diner has taken a seat, the display screen installed on the smart meal ordering device can be used to output a meal ordering interface and to obtain the information of one or more dishes selected by diners in the meal ordering interface. When the smart meal ordering device senses that a diner has left their seat, the smart meal ordering device can look up the unit prices of the information of one or more dishes selected by the user (e.g., the smart meal ordering device can communicate with a server of the offline dining establishment through the aforementioned communication hardware, and look up the unit prices of the dishes on the offline dining establishment's server), and calculate the total price of the dishes selected by the user based on the queried dish unit prices.

After the total price of the dishes selected by the user has been calculated, the smart meal ordering device can use the communication hardware to communicate with the payment server and send the identification information of the smart meal ordering device (e.g., when the smart meal ordering device is a smart dining table, the specific identification information may be the dining table number of the smart dining table) and the calculated total price to the payment server, with the payment server conducting debit settlement corresponding to the total price from the payment account bundled with the identification information.

For one aspect, the user is able to quickly perform meal ordering operations when dining in an offline dining establishment, because the smart meal ordering device can output a meal ordering interface through an installed display screen when the installed body sensing hardware is used to sense when a diner has taken a seat; and for another aspect, because the smart meal ordering device can be bundled with a user's payment account in advance, and the smart meal ordering device can communicate with a payment server and automatically launch debit settlement with the payment server for the dishes selected by a user when the installed body sensing hardware senses that a diner has left their seat, the user does not need to manually launch dining settlement operations through a payment client when they are finished dining; through the smart meal ordering device, it is possible to achieve a closed loop between the user's offline dining and online payments, creating for offline dining establishment merchants a smart dining room payment system that can provide users with a truly "hands-free bill settlement" and barrier-free offline dining experience.

For example, in one embodiment, the smart meal ordering device can be a smart dining table with a display screen, and it is possible to build a smart dining room payment system for an offline dining establishment based on these smart dining tables. In the smart dining room payment system, graphic identification (e.g., a bar code, a two-dimensional code, or another form of recognizable graphic identification) generated based on the identification information of the smart dining table may be attached to the smart dining table. When a user is dining, it is only necessary to use a payment client (e.g., Alipay) to perform a scan of the graphic code and bundle the payment client's payment account with the smart dining table's identification information. Next, the smart dining table can conduct body sensing of diners through the installed body sensing hardware. When the smart meal ordering device senses that a diner has taken a seat, a display screen installed on the smart meal ordering device can be used to output a meal ordering interface and obtain the information of one or more dishes selected by the diner in the meal ordering interface. When the smart meal ordering device senses that a diner has left their seat, the smart meal ordering device can communicate with a payment server, to autonomously launch a debit settlement operation from the bundled payment account. Thus, during the entire dining process, after the diners finish eating, they can directly leave the dining table, and the dining costs are automatically settled without having to call the service personnel. The payment client is used to automatically conduct settlement for the consumed dishes, thus fundamentally achieving a "hands-free bill settlement", barrier-free offline dining experience.

Illustrations of the description are made below through exemplary embodiments with respect to application scenarios.

Figure 1:
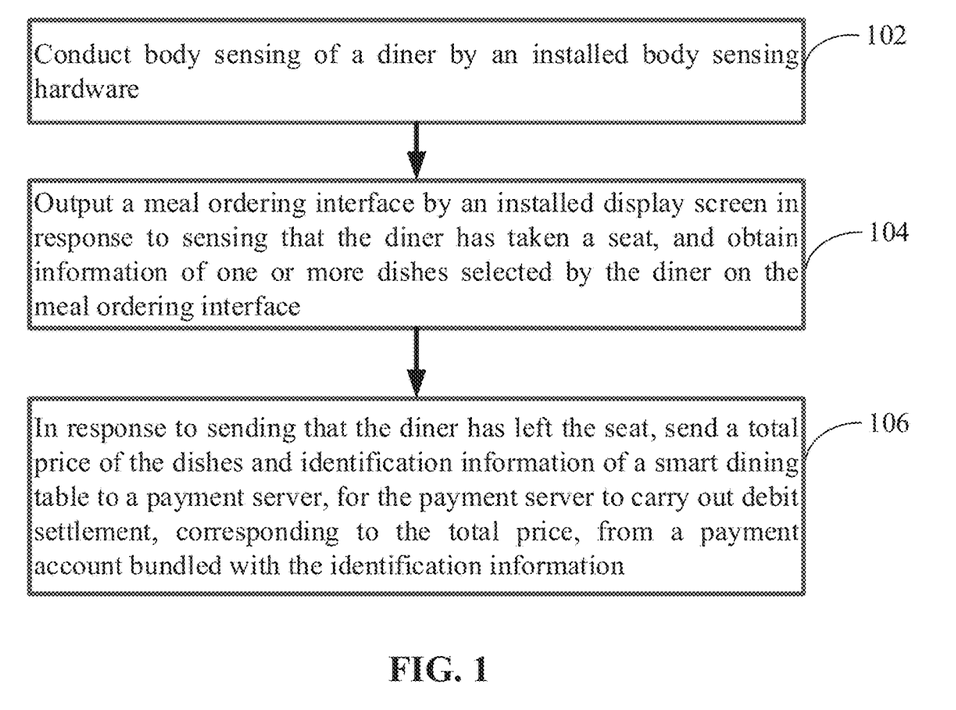
FIG. 1 is a flow chart of a dining settlement method of an embodiment of this description.

Please refer to FIG. 1. FIG. 1 is a dining settlement method of an embodiment of the description, applied to a smart meal ordering device, executing the following steps:

Step 102, conducting body sensing of a diner by an installed body sensing hardware;

Step 104, outputting a meal ordering interface by an installed display screen in response to sensing that the diner has taken a seat, and obtaining information of one or more dishes selected by the diner on the meal ordering interface;

Step 106, in response to sensing that the diner has left the seat, a total price of the dishes and identification information of a smart dining table is sent to a payment server, for the payment server to carry out debit settlement, corresponding to the total price, from a payment account bundled with the identification information.

The smart meal ordering device can comprise a smart carrier of any form or shape capable of providing diners with meal ordering service and autonomous settlement service.

For example, in one presented implementation manner, the smart meal ordering device can be a smart dining table with a display screen, or another form of smart carrier capable of achieving a similar function; e.g., it can be a 3D big screen located in the dining environment.

These smart meal ordering devices can undergo centralized management, ownership, standardization, and customization by the offline dining establishment merchant or service provider (e.g., Alipay), to make it easier to link up these smart meal ordering devices with the merchant or service provider servers providing the smart meal ordering devices with service (dial-in Alipay servers).

Figure 2:
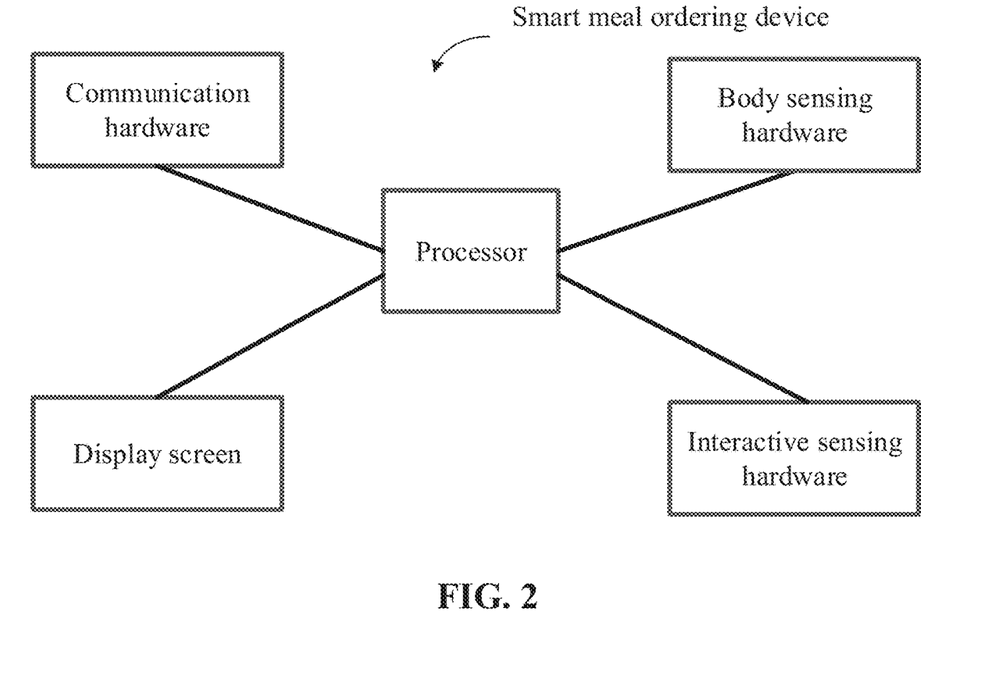
FIG. 2 is a hardware structural diagram of a smart meal ordering device of an embodiment of this description.

Please refer to FIG. 2. FIG. 2 is a hardware structural diagram of a smart meal ordering device presented in the description.

As shown in FIG. 2, in the description, the smart meal ordering device can have a display screen, a processor (e.g., MCU), communication hardware, and body sensing hardware.

The display screen can comprise an interactive display screen of any form, used to output and display a meal ordering interface for diners, and to interact with diners to carry out meal ordering operations.

In actual applications, the display screen can be a projector-based projection-style display screen in order to reduce the hardware costs of these smart meal ordering devices.

Taking the example of using a smart dining table as the smart meal ordering device, the display screen of the smart dining table can be a projection-style display screen based on a transparent table top with a projector located under the transparent table top; under these circumstances, the smart dining table can access a meal ordering page through a communication module, and use the projector to project the meal ordering page onto the transparent table top.

In addition to being a projector-based projection-style display screen, in actual applications, the display screen can also be an integrated liquid crystal display screen. No special limitations are made in the description.

The processor can simultaneously maintain connections with the communication hardware and the body sensing hardware. The specific connection mode is not further detailed in the description.

The body sensing hardware is used to conduct body sensing of diners, identifying the movements of diners such as taking a seat and leaving the seat. No special limitations are placed on the specific type of body sensing hardware in the description.

In one presented implementation manner, the body sensing hardware can be an infrared body sensor or an ultrasonic body sensor, etc. The smart meal ordering device can use the installed infrared body sensor or ultrasonic body sensor to detect the distance between a diner and the smart meal ordering device, and to identify the movements of diners, such as taking a seat and leaving the seat.

Taking the example of using a smart dining table as the smart meal ordering device, during implementation, the body sensing hardware can detect the distance between a diner and the smart dining table and report the detected distance to a processor. After the processor receives the distance reported by the body sensing hardware, the processor can compare the distance with a pre-set threshold value. If the distance is less than or equal to the pre-set threshold value, it can be determined that the diner has taken a seat, and the current dining table is being used by people; conversely, if the distance is greater than the pre-set threshold value, it can be determined that the diner has left the seat.

No special limitations are placed on the specific value of the pre-set threshold value in the description. It may be configured based on the demands of actual applications. For example, in one implementation mode, the pre-set threshold value can be defined as a range of 0.1~40 cm. When the detected distance between the diner and smart dining table is within 0.1~40 cm, it can be determined that the diner has taken a seat; otherwise, it can be determined that the diner has left the seat.

No special limitations are placed on the installation location or the installed number of the body sensing hardware on the smart meal ordering device. In actual applications, and customization may be implemented based on the shape of the smart meal ordering device and actual demands.

Figure 3:
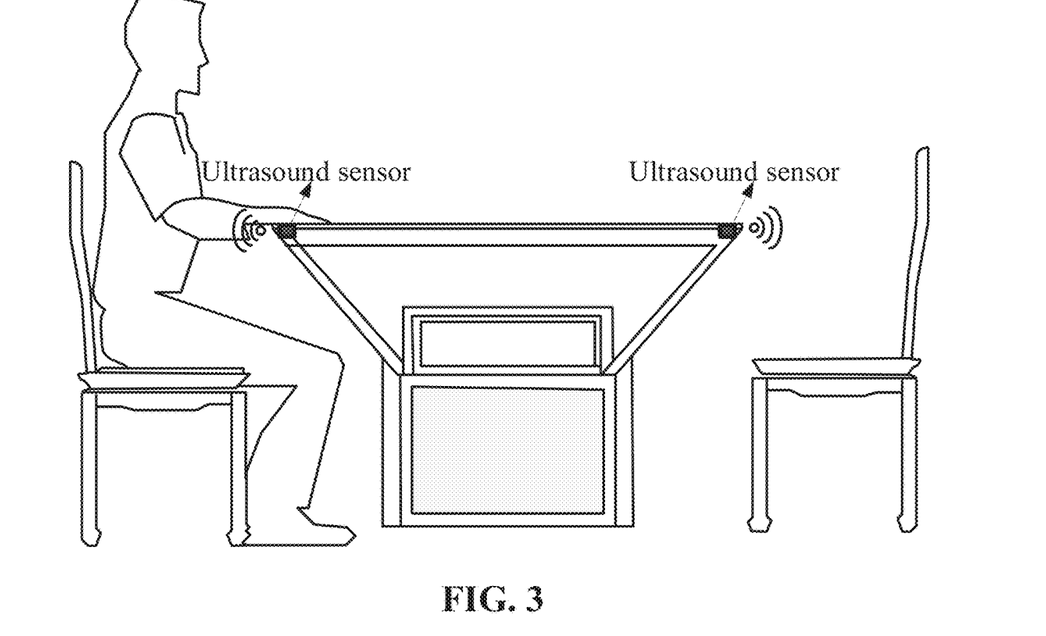
FIG. 3 is a diagram of a body sensing hardware installed on a smart meal ordering device of an embodiment of this description.

Referring to FIG. 3, for example, using a smart dining table as the smart meal ordering device and using an ultrasonic body sensor as the body sensing hardware, the ultrasonic body sensor can be installed under the dining table and facing the vertical plane of the diner's seated position. The number of ultrasonic body sensors installed can be customized based on the number of diners that a dining table can actually seat. In one example of a two-person dining table that can seat two people, each ultrasonic body sensor can be installed on the dining table facing the vertical plane of each of the two seated positions.

The communication hardware is used to conducting external communications through wireless and/or wired connections.

In actual applications, the specific communication hardware can be wireless communication hardware, and it can be wired communication hardware; or, the communication hardware can be hardware that integrates a wireless communication function and a wired communication function.

For example, in one presented implementation manner, the specific communication hardware can be WI-FI hardware (e.g., a WI-FI chip). The smart meal ordering device can use the WI-FI hardware to access a WI-FI hotspot provided by the offline dining establishment, establish wireless connections with the offline dining establishment's server and the aforementioned payment server, and use the wireless connection to wirelessly communicate with the offline dining establishment's server and the payment server.

Continuing to refer to FIG. 2, in the description, the hardware of the smart meal ordering device can include interactive sensing hardware in addition to a display screen, processor, communication hardware, and body sensing hardware.

Here, the specific type of interactive sensing hardware depends on the interaction mode supported by the smart meal ordering device.

In one presented implementation manner, the specific interaction mode supported by the smart meal ordering device can be diners using hovering gestures to interact with the smart meal ordering device. The interactive sensing hardware of the smart meal ordering device that would correspond to the type of interaction mode could be a sensing hardware that is capable of identifying the hovering gestures made by the diner.

Under these circumstances, a smart meal ordering device can pre-define a number of interactive gestures. During the dining process, a diner can interact with the smart meal ordering device by executing special interactive gestures, to carry out corresponding interactive operations, e.g., interactive operations for meal ordering in the meal ordering interface, etc. The smart meal ordering device can invoke the sensing hardware to identify the interactive gesture executed by the diner. When the interactive gesture executed by the diner is identified as a pre-defined interactive gesture, a response to the interactive gesture can be made, immediately triggering the execution of the meal ordering operation corresponding to the interactive gesture.

No special limitations are placed on the pre-defined interactive gestures and the meal ordering operations corresponding to the interactive gestures in the description. In actual applications, individualized customization may be performed based on actual demands. The interactive operations supported by the smart meal ordering device may be triggered by self-defined hovering gestures of any form.

For example, in one example, the defined hovering gestures and the meal ordering operations corresponding to the hovering gestures can be as shown in the following table:

| | A | B | C | D |
|---|---|---|---|---|
| Hand gesture motion | Moving open palm up and down | Moving clenched fist up and down | Moving open palm left and right | Moving clenched fist left and right |
| Meal ordering operation | Look up dish details | Confirm operation | Left-right interface switching | Up-down interface switching |

Here, it should be noted that the defined hovering gestures and the meal ordering operations corresponding to them in the preceding table are merely examples; in actual applications, the meal ordering operations supported by the smart meal ordering device may be expanded based on actual demands, and the hovering gestures corresponding to the expanded interactive operations may be self-defined based on actual demands. For example, the interactive operations supported by the smart meal ordering device in the table may be further expanded to include an interactive operations for launching AA bill settlement, and under these circumstances, a hovering gesture such as "giving a thumbs-up" may be defined as the hovering gesture corresponding to the interactive operation of launching AA bill settlement, etc.

In one presented implementation manner, the smart meal ordering device's sensing hardware used to identify hovering gestures made by a diner may comprise an infrared touch-control frame.

Figure 4:
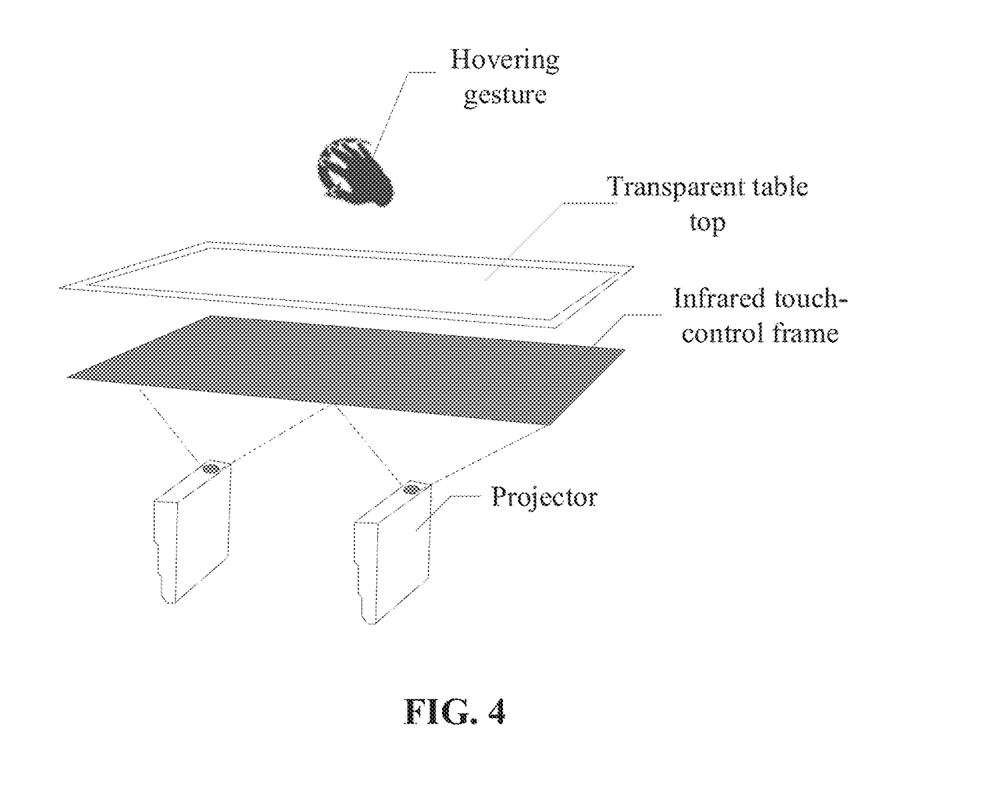
FIG. 4 is a diagram of smart dining table identification of hovering gestures of an embodiment of this description.

As an example, please refer to FIG. 4. Still using a smart dining table as the smart meal ordering device in an example, the display screen of the smart dining table can be a projection-style display screen based on a transparent table top with a projector located under the transparent table top. As shown in FIG. 4, under these circumstances, in addition to having the transparent table top and projector, an infrared touch-control frame may be disposed between the transparent table top and projector. Over the course of eating, a diner may interact with the smart dining table by executing special hovering gestures over the display screen; the smart dining table may invoke the infrared touch-control frame to identify the hovering gestures executed by the diner.

In one presented implementation manner, the smart meal ordering device's specific sensing hardware used to identify hovering gestures made by a diner may comprise a camera capable of identifying hovering gestures, installed on the smart meal ordering device; e.g., a depth camera.

Here, the camera used to identify hovering gestures made by a diner, installed on the smart meal ordering device, may be built in to the smart meal ordering device, externally connected to the smart meal ordering device, or independently located in the dining environment.

Figure 5:
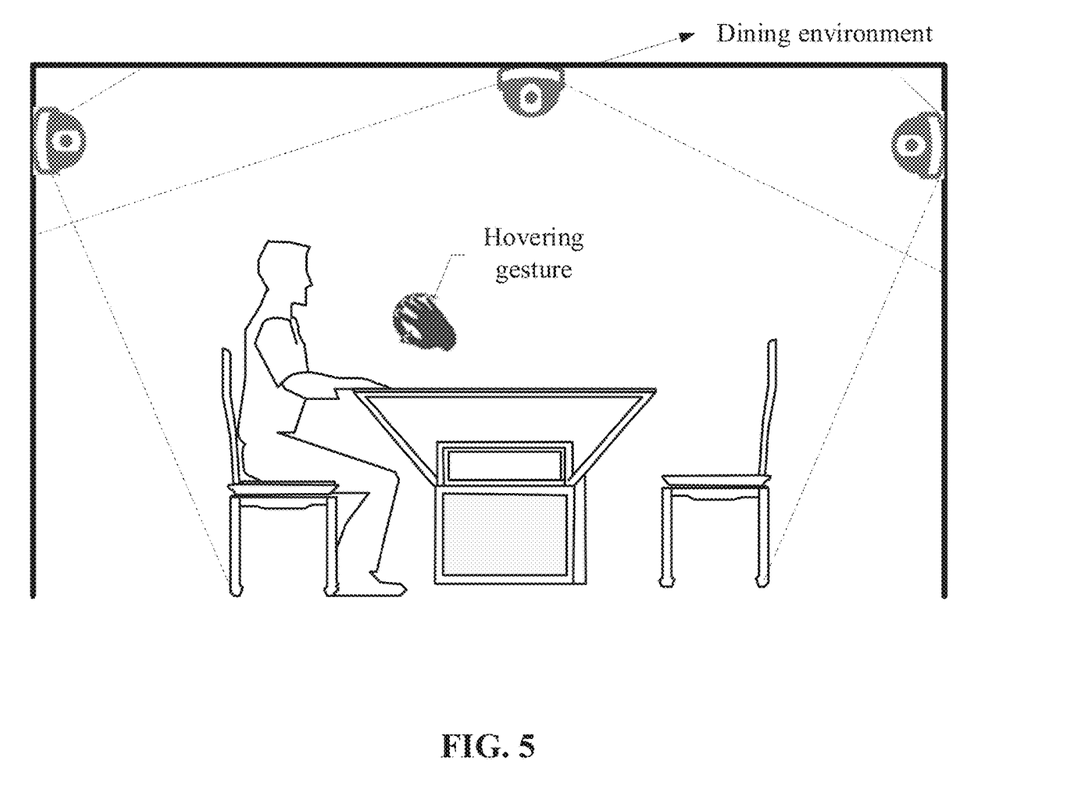
FIG. 5 is diagram of another type of smart dining table identification of hovering gestures of an embodiment of this description.

Referring to FIG. 5, still using a smart dining table as the smart meal ordering device as an example, it is possible to have depth cameras providing different visual angles in the dining environment, over the smart dining table. During the dining process, a diner may interact with the smart dining table by executing special hovering gestures within the range of the visual angles of these cameras. The smart dining table may use these cameras to identify the hovering gestures executed by the diner. For example, these cameras may have preinstalled software programs to identify hovering gestures. They may use these software programs to identify the hovering gestures executed by the diner, and use a wireless/wired communication link to the smart dining table or use a server to transmit the identification results to the smart dining table.

In actual applications, it is also possible to install built-in depth cameras of multiple different visual angles below the smart dining table's display screen; or to place a camera externally connected by a USB port, for example, above the smart dining table's display screen, to identify the hovering gestures executed by diners, which is not further described in the description.

In another presented implementation manner, the specific interaction mode supported by the smart meal ordering device can be a traditional touch-control interaction mode. Under these circumstances, the smart meal ordering device's specific interactive sensing hardware can be a touch-control frame.

Still using a smart dining table as the smart meal ordering device in an example, under these circumstances, the smart dining table's display screen can be a projection-style display screen based on a transparent table top, a projector disposed below the transparent table top, and a touch-control frame disposed between the transparent table top and the projector; or, the smart dining table's display screen can be an integrated liquid crystal display screen supporting touch-control interaction. A diner can interact with the smart meal ordering device by executing corresponding touch operations directly on the smart meal ordering device's display screen.

The example below uses a smart dining table employing the hardware architecture shown in FIG. 2 as the smart meal ordering device, and a detailed description of the technical scheme of the description is given through specific embodiments.

In the description, a graphic code, generated based on the identification information of the smart dining table, can be attached to the smart dining table. For example, the identification information can be the dining table number of the smart dining table (it must be unique), and the graphic code can be a bar code, two-dimensional code, or another form of graphic code generated based on the dining table number.

In actual applications, in addition to being attached to the smart dining table, the graphic code can also be set at the entrance to a dining environment space, e.g., it can be set at the doorway to a private room in an offline dining establishment.

When a diner arrives in a dining environment with a smart dining table, as guided by the service personnel of the offline dining establishment, the diner may use a payment client to scan the graphic code, launching bundling of the payment account corresponding to the payment client with the smart dining table.

In one implementation mode, after a diner uses a payment client to scan the graphic code, the payment client can send the identification information identified from the graphic code and the payment account corresponding to the payment client (i.e., the payment account currently logged in to the payment client) to the payment server. The payment server is used to set up a bundling relationship between the hardware identification and the payment account, and the bundling relationship is maintained on the server.

In actual applications, the aforementioned bundling relationship can be established locally by the payment client. Under these circumstances, after a diner uses a payment client to scan the graphic code, the payment client can locally establish a bundling relationship between the identification information identified from the graphic code and the payment account corresponding to the payment client. Next, the payment client uploads the bundling relationship to the payment server, and the bundling relationship is maintained on that server.

In actual applications, the bundling may be performed through modes other than a diner using a payment client to scan the graphic code, and conducting bundling of the smart dining table with the payment client's corresponding payment account, as described above. No special limitations are imposed on the mode in the description.

For example, in another implementation mode, a smart dining table may use facial recognition technologies to perform bundling of the smart dining table with a diner's payment account. Under these circumstances, a diner can use a payment client to collect their own facial image in advance and upload their facial image to a payment server, with the payment server bundling their facial image with their payment account. After the diner arrives in a dining environment with a smart dining table as guided by service personnel, the smart dining table can use its camera to collect the diner's facial image, and can upload the collected facial image and the identification information of the smart dining table to the payment server. The payment server can identify the uploaded facial image, extract facial features from the facial image, and sequentially match the extracted facial features with the facial image bundled with the payment account. If the uploaded facial image matches the facial image bundled with the payment account, the payment account with which the facial image is bundled can be further bundled with the identification information of the smart dining table.

In some embodiments, in addition to the implementation mode given as an example above, there can be other specific implementation modes of bundling a smart dining table with a diner's payment account, which are not elaborated in the description.

In the description, after the identification information of a smart dining table is successfully bundled with a diner's payment account, the payment server can further obtain user information related to the payment account. For example, the user information can include the user's name and profile image corresponding to the payment account, etc. Afterward, the obtained user information related to the payment account is pushed to the smart dining table and is stored in the smart dining table's system.

In one presented implementation manner, the payment account used for bundling with a smart dining table can be the diner's authorized credit account, e.g., an Alipay Ant Check Later account.

Under these circumstances, the aforementioned graphic code can include the address information of the account authorization page, in addition to the aforementioned identification information. After a diner uses a payment client to scan the graphic code, the payment client can jump to the account authorization page based on the address information of the account authorization page identified in the graphic code, and enter the credit account authorization flow, with the diner using the page to set the credit account from which the dining cost is to be withheld.

After the credit account is successfully authorized, the diner can sit down as guided by service personnel and eat. Afterward the meal's completion, the smart dining table launches debit settlement with the payment server based on the smart dining table identification information bundled with the credit account.

In the description, the smart dining table can use its display screen to input a default start page before the diner takes a seat. After the smart dining table obtains the user information related to the payment account bundled with the smart dining table and pushed by the payment server, the smart dining table can immediately launch its body sensing hardware, invoke the body sensing hardware from backend, and perform body sensing of the diner, to determine whether the diner has taken a seat. Further details of the specific process of using body sensing hardware to perform body sensing of a diner are not further elaborated.

When sensing that a diner has taken a seat, the smart dining table can immediately generate a prompt based on the user information issued by the payment server and output the prompt through its display screen. For example, the prompt can be a welcome message based on the user information, such as the user's name and profile image, corresponding to the payment account and pushed by the payment server.

After the prompt is displayed, the smart dining table can immediately enter the menu mode, outputting the meal ordering page for the diner through the display screen, and obtaining the information of one or more dishes selected by the diner in the meal ordering interface.

Here, when using the meal ordering interface to select dishes, the diner can interact with the smart dining table through the execution of special hovering gestures, and the smart dining table can use its interactive sensing hardware, such as an infrared touch-control frame or camera, to identify the hovering gestures made by a diner, to trigger execution of the corresponding meal ordering operations. Further details of the specific implementation process are not elaborated.

After the diner completes the order, the smart dining table can generate corresponding order information based on the obtained information of one or more dishes selected by the diner in the meal ordering interface and push the generated order information to the server of the offline dining establishment to carry out order placement.

In the description, to achieve truly "hands-free", barrier-free offline dining bill settlement, after the diner finishes eating, the smart dining table can invoke its body sensing hardware from backend to perform body sensing of the diner and determine whether the diner has left their seat.

In response to sensing that the diner has left their seat, the current dining experience can be viewed as completed. At this time, the smart dining table can communicate with the server of the offline dining establishment, look up the unit prices of the dishes on the offline dining establishment's server, and calculate the total price of the dishes selected by the diner based on the queried dish unit prices. Afterward, the smart dining table can take the information of one or more dishes selected by the diner and the total price of the dishes and output them as a bill through its display screen, for the diner to reconfirm the bill. After the diner confirms the bill, a settlement request based on the calculated total price and the identification information of the smart dining table can be generated and sent to the payment server to launch dining settlement. After the payment server receives the settlement request, the payment server can look up the bundled payment account based on the smart dining table identification information, and then complete the debit deduction from the payment account.

In actual applications, after the smart dining table calculates the total price of the dishes selected by the diner, the smart dining table can directly generate the settlement request to have the payment server launch dining settlement without outputting it for the diner to confirm.

After the debit has been completed, the smart dining table and payment server can promptly delete the locally maintained bundling relationship between the smart dining table identification information and the payment account, to ensure the security of the diner's payment account and avoid failing to promptly delete the bundling relationship which leads to mistaken debit deductions when other diners sit and dine at the smart dining table.

In some embodiments, because a diner might leave their seat midway through the dining process, if the smart dining table mistakes the diner leaving midway as the meal's completion, there is the possibility that dining settlement could be completed before the diner has finished eating.

In the description, to address the situation, when the smart dining table senses that a diner has left the seat, the smart dining table can further determine whether the number of people who have left the seat is the number of diners. If the number of individuals leaving the seat is the number of diners, it indicates that all of the diners sitting at the smart dining table have left the table. At this time, dining can be viewed as completed, and the smart dining table can immediately send the settlement request, generated based on the calculated total price and the smart dining table identification information, to the payment server to launch dining settlement.

Here, to further reduce the probability of error, when the smart dining table uses the above mode to determine whether dining is over, an away-from-table time-out mechanism can be introduced. Under these circumstances, after the smart dining table determines that the number of individuals having left the seat is the number of diners, the smart dining table can further determine whether the away time for each person who has left reaches a threshold value. If the away time for all people who have left their seats each reach the threshold value, it indicates that all of the diners who were sitting at the smart dining table have left the table. At this time, the dining can be determined as completed, and the smart dining table can immediately send the settlement request, generated based on the calculated total price and the smart dining table identification information, to the payment server to launch dining settlement. No special limitations are placed on the specific value of the threshold value in the description. In actual applications, the specific value of the threshold value may be user-defined based on actual demands.

In the description, the number of diners can be recorded when the smart dining table senses that the diners have taken a seat. For example, in implementation, every time the smart dining table senses that a diner has taken a seat through its body sensing hardware, the smart dining table can immediately count the people sitting. Thus, using the count result, the smart dining table can obtain the total number of diners sitting at the smart dining table (i.e., the first number).

In addition, to guarantee the accuracy of the number of seated individuals recorded by the smart dining table, in actual applications, cameras located in the dining environment can assist the smart dining table in identifying the number of seated diners (i.e., the second number). For example, using a private room as the dining environment in an example, a camera can be disposed at the top of the private room and can be used to identify the number of people currently sitting and dining in the private room.

Under these circumstances, the smart dining table can obtain the number of seated individuals identified by the camera located in the dining environment and can compare the obtained number of seated individuals with the number of seated individuals recorded by the smart dining table. If the two are not the same, the smart dining table can revise the number of seated individuals recorded by the smart dining table based on the number of seated individuals identified by the camera located in the dining environment. In this way, it is possible to improve the accuracy of the number of seated individuals recorded by the smart dining table.

In this description, the smart dining table can also pre-set a maximum dining time threshold value. Here, when a diner's dining time reaches the maximum dining time threshold value, the smart dining table can immediately send a settlement request, generated based on the calculated total price and the smart dining table identification information, to the payment server to launch dining settlement.

Under these circumstances, the smart dining table can use the diner's seating moment (e.g., the moment when all diners are seated) as the dining starting moment, to calculate the diner's dining time. If the smart dining table uses the aforementioned mode and determines that the number of individuals who have left their seats has not reached the number of diners, the smart dining table can further determine whether the dining time has reached the maximum dining time threshold value. If the dining time has reached the maximum dining time threshold value, maximum dining can immediately trigger the dining settlement flow presented above and send a settlement request, generated based on the calculated total price and the smart dining table identification information, to the payment server to launch dining settlement.

In the description, to help offline dining establishments conduct customer flow analysis, the smart dining table can also tally the total number of visitors and the total number of consumers.

For one aspect, the smart dining table can tally the number of seated individuals after dining settlement.

For another aspect, the smart dining table can be equipped with a WI-FI probe program, for example, to detect the total number of users accessing the WI-FI hotspot provided by the offline dining establishment, tallying the total number of users detected through the WI-FI probe program to serve as the total number of visitors.

After the tallies have been completed, the smart dining table can feed the tally results back to the server of the offline dining establishment. For example, on one day, the smart dining table can feed back the tally results for the previous day. By collecting simultaneous tally results from all of the smart dining tables, the offline dining establishment server can aggregate the total number of visitors and the total number of actual dining consumers. Next, the offline dining establishment server can perform statistical analyses and calculations on the aggregated total number of visitors and total number of actual consumers, to arrive at business indicators such as user churn numbers. In actual applications, the two tally processes presented above can also be autonomously conducted by an offline dining establishment server. No special limitations are imposed in the description.

In the description, after the payment server completes debit settlement from the payment account bundled with the smart dining table identification information, the payment server can also push the settlement results to the payment client corresponding to the payment account. For example, the settlement results can be a debit prompt comprising the amount to be withheld for dining consumption. At this time, the diner can confirm the bill by looking up the settlement results pushed by the payment server, and can leave the establishment following confirmation that no mistakes have been made.

In this embodiment, throughout the entire process of diners coming to the offline dining establishment for consumption, the merchant can use deployed smart dining tables to automatically carry out debit settlement for dining costs after the diners have finished eating, thus truly achieving "hands-free", barrier-free offline dining settlement. This can notably improve the dining experience of the diners.

Figure 6:
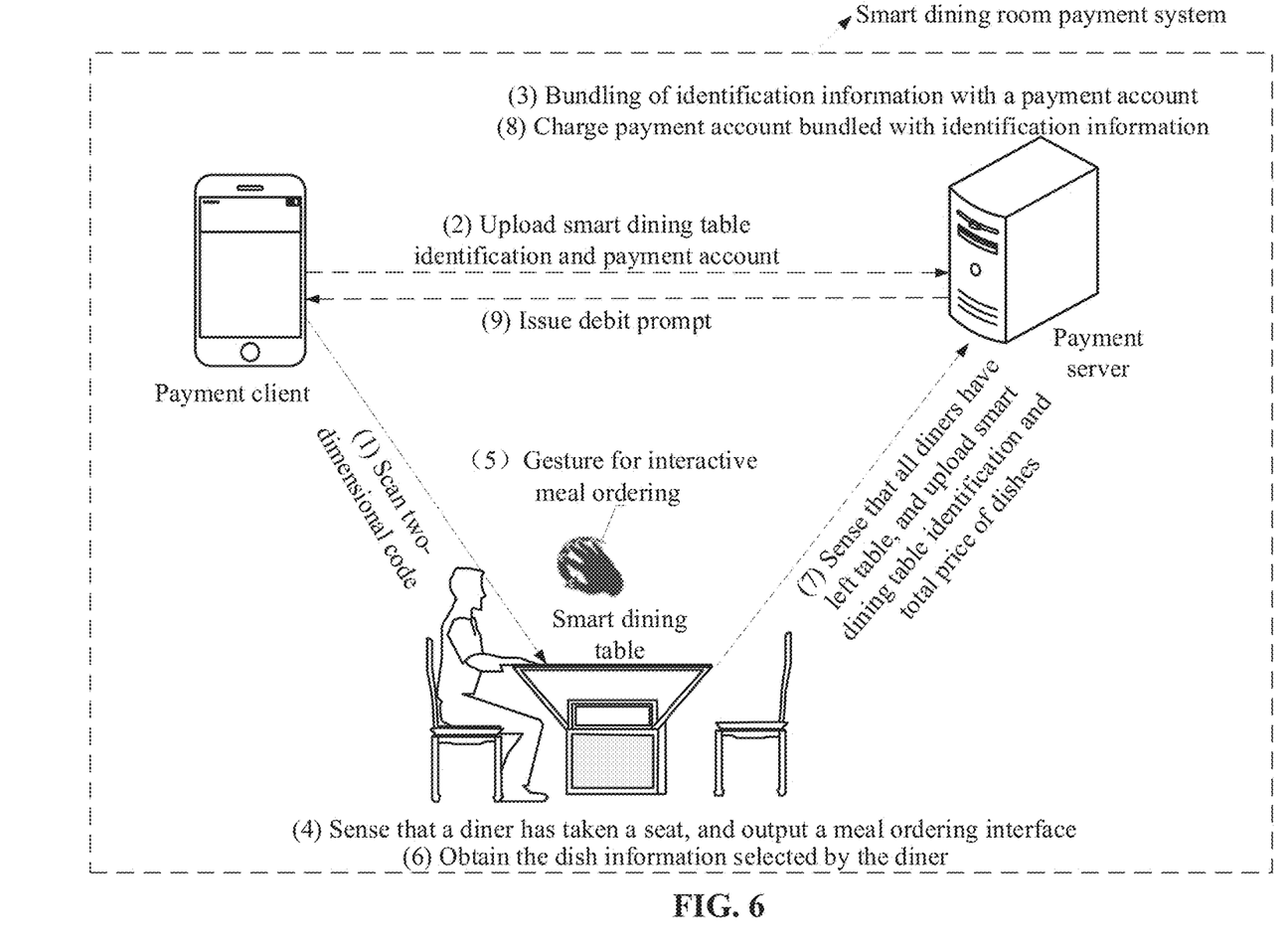
FIG. 6 is a diagram of a smart dining room payment system built upon smart dining tables presented by an embodiment of this description.

Please refer to FIG. 6. FIG. 6 is a structural diagram of a smart dining room payment system built upon smart dining tables presented by the description.

As shown in FIG. 6, the smart dining room payment system can comprise a payment server (e.g., Alipay payment platform) and smart dining tables capable of remote communications with the payment server.

In a presented implementation manner, the smart dining room payment system can also comprise the user's payment client (e.g., Alipay client), etc., in addition to the smart dining tables and payment server.

In its initial state, smart dining tables can be pre-deployed in an offline dining establishment in which the smart dining room payment system is deployed. For example, a number of private rooms can be planned, deploying an independent smart dining table in each private room. Here, all of these smart dining tables can have a two-dimensional code attached, which was generated based on the smart dining table's identification information.

A diner can use the scan function of a payment client to scan the two-dimensional code attached to the smart dining table. After the identification information is identified from the graphic code, bundling is launched between the corresponding payment account (e.g., a user's authorized credit account) logged on to the payment client and the smart dining table, and the bundling relationship is maintained on the payment server. For the specific bundling process, a person skilled in the art may refer to previous embodiments; further details will not be given in this embodiment.

When a diner has a meal at the offline dining establishment, the smart dining table can use its body sensing module to sense the movements of the user as they sit down and get up.

For one aspect, if sensing that a diner has taken a seat, the smart dining table can immediately output a meal ordering interface through its display screen, and the diner can interact with the smart dining table through hovering gestures, for example, to carry out meal ordering operations. For the specific interaction implementation process, a person skilled in the art may refer to previous embodiments; further details will not be given in this embodiment.

And for another aspect, if the smart dining table senses that all of the diners have left their seats, or if the time for which all of the diners have been away from their seats has reached a threshold value (e.g., 30 minutes), their dining can be determined as completed. The smart dining table can immediately generate a settlement request based on the smart dining table identification information and the total price of the dishes selected by the user, and can send the settlement request to the payment server. The payment server automatically conducts debit settlement from the payment account bundled with the identification information of the smart dining table, and issues a related prompt (e.g., a debit prompt) to the payment client after successful debit settlement.

Clearly, in the smart dining room payment system, after a user finishes eating, she can directly leave her seat, automatically triggering debit settlement. Therefore, during the entire dining process, it is no longer necessary to undertake settlement operations of any form (e.g., the user no longer needs to call service personnel to pay at the end of a meal), thus fundamentally achieving a "hands-free", barrier-free offline dining settlement. Not only the dining experience of the diners can be improved, for offline dining establishments, it is no longer necessary for service personnel to confirm and check the dining table where settlement has been completed. Thus, the management costs of the offline dining establishments can be lowered.

Figure 7:
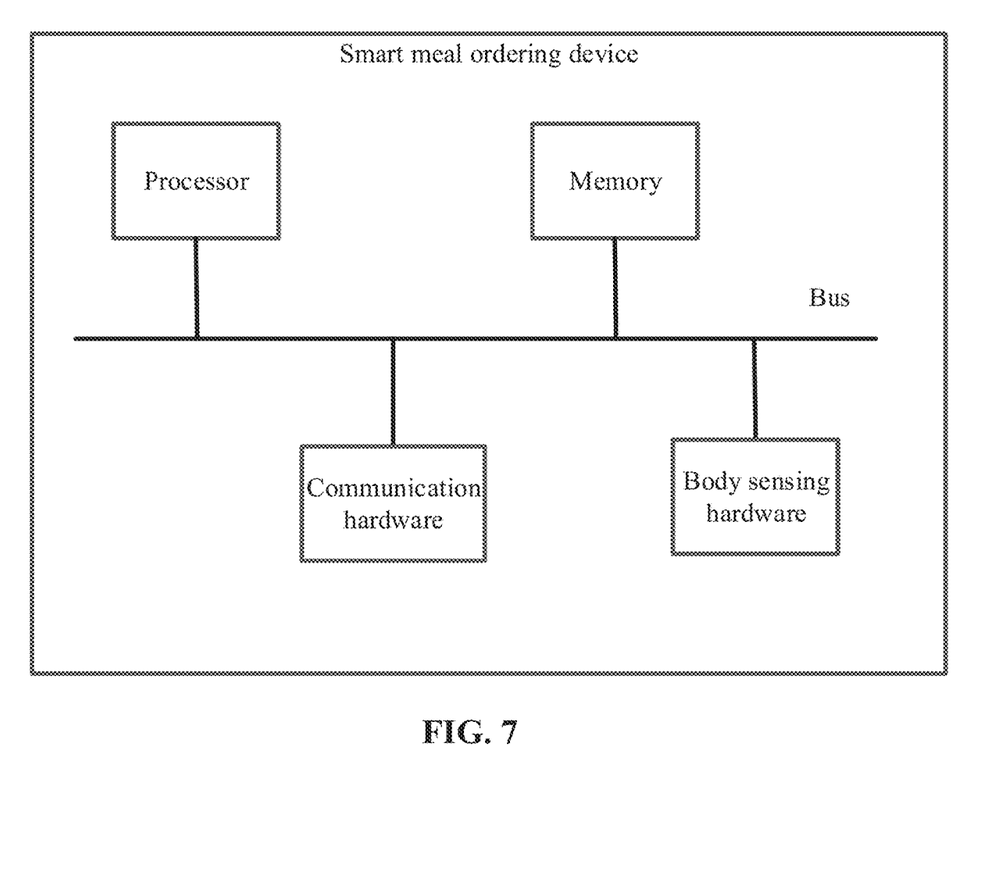
FIG. 7 is a structural diagram of the hardware involved in a smart meal ordering device supporting the dining settlement method provided by an embodiment of this description.

Please refer to FIG. 7. Corresponding to the preceding method embodiments, the description also provides embodiments for a smart meal ordering device.

As shown in FIG. 7, the smart meal ordering device comprises:

a body sensing hardware, conducting body sensing of diners;

a communication hardware, conducting external communications through wireless and/or wired connections;

a processor, and a memory used to store machine-executable instructions; here, the processor and memory are usually connected to each other through an internal bus. The processor can be achieved through modes such as a general-purpose CPU (Central Processing Unit, central processor), microprocessor, application specific integrated circuit (ASIC), or one or more integrated circuits. The processor is used to execute related programs, to achieve the technical scheme provided by the embodiments of the description. The memory may be a non-transitory computer-readable storage medium storing instructions that, when executed by the processor, cause the processor to perform various steps described herein.

In some embodiments, by reading and executing the machine-executable instructions corresponding to dining settlement control logic and stored in the memory, the processor is caused to do the following:

when the body sensing hardware senses that a diner has taken a seat, the processor outputs a meal ordering interface through an installed display screen and obtains the information of one or more dishes selected by diners in the meal ordering interface; and when the body sensing hardware senses that a diner has left their seat, the total price of the dishes and the identification information of the smart dining table are sent to a payment server, for the payment server to carry out debit settlement, corresponding to the total price, from a payment account bundled with the identification information.

In some embodiments, a graphic code, generated based on the identification information of the smart meal ordering device, is attached to the smart meal ordering device.

In some embodiments, by reading and executing the machine-executable instructions corresponding to dining settlement control logic and stored in the memory, the processor is caused to do the following:

collecting the facial image of diners through an installed camera; and uploading the collected facial image and the smart dining table's identification information to the payment server, for the payment server to bundle the smart dining table identification information with a payment account bundled with the facial image.

In some embodiments, by reading and executing the machine-executable instructions corresponding to dining settlement control logic and stored in the memory, the processor is induced to do the following:

identifying hovering gestures made by a diner; determining whether the identified hovering gesture matches a pre-set interactive gesture; and triggering an interactive operation corresponding to the interactive gesture if the identified hovering gesture matches a pre-set interactive gesture.

In some embodiments, by reading and executing the machine-executable instructions corresponding to dining settlement control logic and stored in the memory, the processor is induced to do the following:

determining whether the number of individuals leaving their seats is the number of diners when sensing that a diner has left the seat; if the number of individuals leaving their seats is the number of diners, sending the total price of the dishes and the identification of the smart dining table to a payment server; or, if the number of individuals leaving their seats is the number of diners, and the length of time for which each individual left the seat reaches a threshold value, sending the total price of the dishes and the identification of the smart dining table to a payment server.

In some embodiments, the payment account is an authorized credit account of a diner. The smart meal ordering device is a smart dining table.

The above is a description of some embodiments of the description. Other embodiments fall within the scope of the attached Claims. Under certain conditions, it is possible to achieve the desired results by executing the actions or steps in the Claims in a sequence different from that of the embodiments. In addition, the processes illustrated in the accompanying drawings do not require following the specific sequences or consecutive orders shown in order to achieve the desired results. In certain implementation manners, multitasking and parallel processing are possible or may be preferable.

The separate embodiments in the description are described progressively, and it is sufficient for the embodiments to reference each other regarding their similar parts. The description of each embodiment focuses on the ways different from other embodiments. In particular, the descriptions of apparatus, system, electronic device, and non-volatile computer storage media embodiments are relatively simple because they are basically identical to the method embodiments, and description of correlated features by reference to the method embodiments is sufficient.

The preceding implementation manner descriptions make it clear that a person skilled in the art can clearly understand that the embodiments of the description may be achieved with the help of software plus the necessary general-purpose hardware platforms. Based on such an understanding, the essence of the technical scheme of the embodiments of the description, or the part contributing to the prior art, may be implemented in the form of a software product. The computer software product may be stored in a storage medium, such as a ROM/RAM, magnetic disk, or optical disk, and may include a number of instructions to cause a computer device (which may be a personal computer, server, or network device) to perform the methods of the embodiments, or certain parts of the embodiments, of the description.

The system, apparatus, modules, or elements illustrated in the preceding embodiments can be achieved by a computer chip or entity, or by a product possessing certain functions. Atypical implementation device is a computer. The specific form of the computer may be a personal computer, laptop computer, cell phone, camera phone, smart phone, personal digital assistant, media player, navigation device, email device, game console, tablet computer, wearable device, or a combination of any of these devices.

The separate embodiments in the description are described progressively, and it is sufficient for the embodiments to reference each other regarding their similar parts. The description of each embodiment focuses on the ways in which it differs from other embodiments. In particular, the descriptions of apparatus embodiments are relatively simple because they are basically identical to the method embodiments, and description of correlated features by reference to the method embodiments is sufficient. The apparatus embodiments described above are merely illustrative. Here, the modules described as separate parts may or may not be physically separate. When implementing the embodiment schemes of the description, the functions of each module may be achieved in the same or multiple software and/or hardware units. Some or all of the modules may be selected to achieve the objective of the scheme of these embodiments, based on actual needs. This can be understood and implemented by a person having ordinary skill in the art, making no expenditure of creative labor.

The preceding are merely specific implementation manners of the embodiments of the description. A person having ordinary skill in the art may make a number of improvements and embellishments without deviating from the principles of the embodiments of the description, and these improvements and embellishments shall fall within the scope of protection of the embodiments of the description.

The invention claimed is:

1. A smart meal ordering method, comprising:
conducting body sensing of a diner by a body sensing hardware of a smart meal ordering device of a merchant, wherein conducting body sensing of the diner comprises the smart meal ordering device sensing that the diner has taken a seat at a dining table;
outputting a meal ordering interface by a display screen of the smart meal ordering device in response to sensing that the diner has taken a seat at the dining table;
obtaining information of one or more dishes selected by the diner on the meal ordering interface;
collecting a facial image of the diner by a camera of the smart meal ordering device of the merchant;
uploading, using the smart meal ordering device of the merchant, the facial image of the diner collected by the smart meal ordering device and identification information of the smart meal ordering device to a server for the server to establish, based on the facial image of the diner collected by the smart meal ordering device and a facial image of the diner previously uploaded by a client device of the diner, a bundling relationship by bundling the identification information with a payment account of the diner associated with the facial image collected by the smart meal ordering device;
sensing that the diner has left the seat at the dining table; and
in response to sensing that the diner has left the seat at the dining table, automatically launching, by the smart meal ordering device of the merchant, based on the established bundling relationship between the smart meal ordering device and the payment account of the diner, a debit settlement corresponding to a total price of the dishes to the server.

2. The method according to claim 1, wherein:
a graphic code generated based on the identification information of the smart meal ordering device is attached to the smart meal ordering device; and
the graphic code is configured for scanning by a client device of the diner and for establishing, by the client device or the server, the bundling relationship between the identification information identified from the graphic code and the payment account of the diner.

3. The method according to claim 1, further comprising:
obtaining user information of the diner pushed by the server, corresponding to the payment account; and
using the display screen to output a prompt, wherein the prompt comprises the obtained user information.

4. The method according to claim 1, further comprising:
identifying a hovering gesture made by the diner;
determining whether the identified hovering gesture matches a pre-set interactive gesture; and
triggering an interactive operation corresponding to the interactive gesture if the identified hovering gesture matches a pre-set interactive gesture.

5. The method according to claim 1, wherein the body sensing of the diner by the body sensing hardware comprises:
sensing a distance between the diner and the dining table by the body sensing hardware;
determining that the diner has taken the seat if the distance is less than or equal to a threshold value; and
determining that the diner has left the seat if the distance is greater than the threshold value.

6. The method according to claim 1, further comprising:
recording a first number of seated diners at the dining table sensed by the body sensing hardware;

obtaining a second number of seated diners at the dining table identified by a camera;
comparing the first number to the second number; and
revising the first number based on the second number when the first number and the second number are not the same.

7. The method according to claim 1, further comprising:
in response to sensing that the diner has left the seat at the dining table, determining whether a number of individuals having left their seats at the dining table is a number of diners at the dining table; and
if the number of individuals having left their seats is the number of diners, sending the total price of the dishes and the identification information of the smart meal ordering device to the server.

8. The method according to claim 1, further comprising:
using a moment when the diner takes the seat as a starting moment, calculating a dining time at the dining table;
determining whether the dining time has reached a threshold value; and
if the dining time has reached the threshold value, sending the total price of the dishes and the identification information of the smart meal ordering device to the server.

9. The method according to claim 1, wherein:
the server is caused to transact payment for the dishes from the payment account of the diner to pay the total price.

10. The method according to claim 1, wherein the smart meal ordering device comprises the dining table, wherein the dining table is configured to sense that the diner has taken the seat at the dining table and that the diner has left the seat at the dining table.

11. A smart meal ordering device, comprising:
a sensor configured to conduct body sensing of a diner to:
  sense when the diner has taken a seat at a dining table; and
  sense when the diner has left the seat at the dining table;
a display screen configured to output a meal ordering interface in response to the sensor sensing that the diner has taken the seat at the dining table, and obtain information of one or more dishes selected by the diner on the meal ordering interface;
a camera for collecting a facial image of the diner;
a processor configured to:
  upload the collected facial image of the diner and identification information of the smart meal ordering device to a server, for the server to establish, based on the facial image of the diner collected by the smart meal ordering device and a facial image of the diner previously uploaded by a client device of the diner, a bundling relationship by bundling the identification information with a payment account associated with the facial image collected by the smart meal ordering device; and
  in response to the sensor sensing that the diner has left the seat at the dining table, automatically launching, based on the established bundling relationship between the smart meal ordering device and the payment account of the diner, a debit settlement corresponding to a total price of the dishes to the server.

12. The device according to claim 11, further comprising:
a graphic code generated based on the identification information of the smart meal ordering device, wherein:
the graphic code is configured for scanning by a client device of the diner and for establishing, by the client device or the server, the bundling relationship between the identification information identified from the graphic code and the payment account of the diner.

13. The device according to claim 11, wherein:
the processor is further configured to obtain user information of the diner pushed by the server, corresponding to the payment account; and
the display screen is further configured to output a prompt, wherein the prompt comprises the obtained user information.

14. The device according to claim 11, further comprising:
another sensor configured to identify a hovering gesture made by the diner; and
the processor is further configured to determine whether the identified hovering gesture matches a pre-set interactive gesture, and trigger an interactive operation corresponding to the interactive gesture if the identified hovering gesture matches a preset interactive gesture.

15. The device according to claim 14, wherein:
the another sensor comprises an least one of infrared touch-control frame or another camera.

16. The device according to claim 11, wherein:
to conduct body sensing of the diner, the sensor is configured to sense a distance between the diner and the dining table by the body sensing hardware; and
the processor is configured to determine that the diner has taken the seat if the distance is less than or equal to a threshold value, and determine that the diner has left the seat if the distance is greater than the threshold value.

17. The device according to claim 11, wherein the sensor, the display screen, and the processor are disposed in the dining table.

18. The device according to claim 11, wherein the sensor comprises at least one of an infrared body sensor or an ultrasonic body sensor.

19. The method of claim 1, further comprising: after the debit settlement has been completed, deleting, by the smart meal ordering device, the locally maintained bundling relationship between the smart meal ordering device identification information and the payment account.

20. The device of claim 11, wherein the processor is further configured to: after the debit settlement has been completed, deleting the locally maintained bundling relationship between the smart meal ordering device identification information and the payment account.

* * * * *